United States Patent
Cheung et al.

(10) Patent No.: US 7,009,310 B2
(45) Date of Patent: Mar. 7, 2006

(54) AUTONOMOUS POWER SOURCE

(75) Inventors: Jeffrey T. Cheung, Thousand Oaks, CA (US); James A. Latty, Westlake Village, CA (US)

(73) Assignee: Rockwell Scientific Licensing, LLC, Thousand Oaks, CA (US)

(*) Notice: Subject to any disclaimer, the term of this patent is extended or adjusted under 35 U.S.C. 154(b) by 108 days.

(21) Appl. No.: 10/756,990

(22) Filed: Jan. 12, 2004

(65) Prior Publication Data

US 2005/0151375 A1  Jul. 14, 2005

(51) Int. Cl.
*H02K 33/00* (2006.01)
*H02K 35/00* (2006.01)
*H02K 7/06* (2006.01)
*H02P 9/04* (2006.01)
*F03B 13/12* (2006.01)

(52) U.S. Cl. .................................... 290/1 R
(58) Field of Classification Search .............. 290/1 R
See application file for complete search history.

(56) References Cited

U.S. PATENT DOCUMENTS

| | | | |
|---|---|---|---|
| 2,944,160 A * | 7/1960 | Dickinson .................. 290/1 R |
| 2,992,342 A * | 7/1961 | Schmidt et al. ............. 310/15 |
| 3,377,113 A * | 4/1968 | Wilson ....................... 310/90.5 |
| 3,503,658 A * | 3/1970 | Remmers .................... 384/113 |
| 3,612,630 A * | 10/1971 | Rosensweig ............... 310/90.5 |
| 3,726,574 A * | 4/1973 | Tuffias et al. .............. 384/133 |
| 3,734,578 A * | 5/1973 | Rosensweig ............... 310/90.5 |
| 3,746,407 A * | 7/1973 | Stiles et al. ................ 384/133 |
| 3,780,593 A * | 12/1973 | Coleman et al. ............ 74/5 R |
| 3,834,775 A * | 9/1974 | Tuffias et al. .............. 384/133 |
| 3,839,904 A * | 10/1974 | Stripling et al. ............ 73/654 |
| 3,977,739 A * | 8/1976 | Moskowitz et al. ......... 384/446 |
| 4,064,409 A * | 12/1977 | Redman ...................... 310/306 |
| 4,260,901 A * | 4/1981 | Woodbridge ................. 290/42 |
| 4,316,394 A * | 2/1982 | Dohogne ..................... 74/5.46 |
| 4,344,004 A * | 8/1982 | Okubo ........................ 307/400 |
| 4,349,757 A * | 9/1982 | Bhate ......................... 360/15 |
| 4,454,426 A * | 6/1984 | Benson ....................... 290/1 R |
| 4,500,827 A * | 2/1985 | Merritt et al. .............. 322/3 |
| 4,518,882 A * | 5/1985 | Morino et al. .............. 310/15 |
| 4,645,960 A * | 2/1987 | Hoffman .................... 310/90.5 |
| 4,706,498 A * | 11/1987 | Nemnich et al. ......... 73/514.08 |
| 4,965,864 A * | 10/1990 | Roth et al. .................. 318/135 |
| 5,175,457 A * | 12/1992 | Vincent ...................... 310/15 |
| 5,180,939 A * | 1/1993 | Rosswurm ................... 310/27 |
| 5,341,055 A * | 8/1994 | Roche ......................... 310/24 |
| 5,347,186 A * | 9/1994 | Konotchick ................ 310/17 |
| 5,432,382 A * | 7/1995 | Pawlowski ................. 290/1 R |
| 5,446,319 A * | 8/1995 | Pawlowski ................. 290/1 R |

(Continued)

Primary Examiner—Darren Schuberg
Assistant Examiner—Pedro J. Cuevas
(74) Attorney, Agent, or Firm—Koppel, Jacobs, Patrick & Heybl

(57) ABSTRACT

An autonomous power source comprises a power harvester mounted on a movable structure. The power harvester includes a coil, a magnet, and a low-friction ferrofluidic bearing in contact with the magnet, arranged such that the magnet and coil move with respect to each other when the structure is in motion such that an electrical current is produced in the coil. This current is converted to power and stored in an energy storage system and is thus available to power electronic circuitry. The magnet and bearing are preferably enclosed within a closed linear or circular tube, with the coil mounted around the exterior of the tube. The power harvester and battery are combined with one or more sensors and a wireless transmitter to form a tire pressure monitoring system.

47 Claims, 11 Drawing Sheets

U.S. PATENT DOCUMENTS

| | | | | |
|---|---|---|---|---|
| 5,452,520 A | * | 9/1995 | Raj et al. | 33/366.18 |
| 5,456,013 A | * | 10/1995 | Elias | 33/366.18 |
| 5,502,968 A | * | 4/1996 | Beale | 62/6 |
| 5,524,985 A | * | 6/1996 | Dunfield | 384/107 |
| 5,537,820 A | * | 7/1996 | Beale et al. | 60/517 |
| 5,552,973 A | * | 9/1996 | Hsu | 362/192 |
| 5,578,877 A | * | 11/1996 | Tiemann | 310/15 |
| 5,632,093 A | * | 5/1997 | Elias | 33/366.25 |
| 5,723,917 A | * | 3/1998 | Chitayat | 310/12 |
| 5,780,741 A | * | 7/1998 | Raj | 735/514.08 |
| 5,818,132 A | * | 10/1998 | Konotchick | 310/17 |
| 5,834,870 A | * | 11/1998 | Tokushima et al. | 310/90 |
| 5,908,987 A | * | 6/1999 | Raj | 73/514.09 |
| 6,056,889 A | | 5/2000 | Tsuda | 252/62.52 |
| 6,220,719 B1 | * | 4/2001 | Vetorino et al. | 362/192 |
| 6,462,439 B1 | * | 10/2002 | Denne | 310/17 |
| 6,489,694 B1 | | 12/2002 | Chass | 310/11 |
| 6,504,271 B1 | | 1/2003 | Chass | 310/11 |
| 6,628,017 B1 | | 9/2003 | Chass | 310/11 |
| 6,644,760 B1 | * | 11/2003 | Nakano et al. | 303/117.1 |
| 6,768,230 B1 | * | 7/2004 | Cheung et al. | 310/30 |
| 6,809,427 B1 | * | 10/2004 | Cheung et al. | 290/1 R |
| 6,812,583 B1 | * | 11/2004 | Cheung et al. | 290/1 R |
| 6,914,351 B1 | * | 7/2005 | Chertok | 310/12 |
| 6,916,017 B1 | * | 7/2005 | Noe | 267/161 |
| 6,945,375 B1 | * | 9/2005 | Kirkwood et al. | 192/84.6 |
| 6,946,754 B1 | * | 9/2005 | Inagaki et al. | 310/12 |

* cited by examiner

AUTONOMOUS POWER SOURCE

BACKGROUND OF THE INVENTION

1. Field of the Invention

This invention relates to the field of power sources, and particularly to power sources which convert motion into energy.

2. Description of the Related Art

Recently passed government legislation mandates that certain types of vehicles provide on-board, real time tire pressure monitoring—i.e., a system which monitors the air pressure in all vehicle tires. This requires an electronics package to be mounted on or inside the tire or wheel, which is small enough so as to not cause any major weight imbalance. The package would include an air pressure sensor and a means of wirelessly transmitting sensor output data to the vehicle driver, or of storing the data for later retrieval.

The electronics package must be powered, typically by a battery. Several approaches have been considered for the power source. In one approach, a conventional battery is mounted inside the tire, secured to the wheel with a metal band. The system operates until the battery reaches the end of its useful life, which is likely to happen before the tire needs replacing. As such, the battery must be replaced, which requires that the tire be removed from the wheel. This periodic battery replacement is costly.

A second approach employs a rechargeable battery placed within the tire, which is charged via inductive coupling with a power source outside of the tire. For the coupling to be effective, the inductive power source must be mounted very close to the tire. This system also has several drawbacks. The close distance required between tire and charger may pose a safety concern. In addition, substances such as mud or snow can accumulate on the tire or inductive power source and impede the performance of the charging system.

Another approach has the electronics package wired to the tire valve, with the battery and/or electronics mounted on the tire's valve stem and monitoring the tire pressure via the valve. Unfortunately, this approach makes the external unit an easy target for theft.

SUMMARY OF THE INVENTION

An autonomous power source is presented which provides an output current by converting motion to energy, and is well-suited for use in a tire-pressure monitoring system.

The present power source comprises a power harvester mounted on a movable structure such as a wheel. The power harvester includes a conductive coil, a magnet, and a low-friction ferrofluidic bearing in contact with the magnet. The magnet, coil, and bearing are arranged such that the magnet and coil move with respect to each other when the movable structure is in motion such that an electrical current is produced in the coil. This current may then be converted to power and stored in an energy storage system such as a rechargeable battery, which may in turn power electronic circuitry. For example, a tire pressure monitoring system might include an air pressure sensor and a wireless transmitter which is powered by a battery kept charged with the present power source.

The power harvester preferably comprises a closed non-magnetic tube, with the magnet and bearing enclosed within the tube such that the magnet is free to move within the tube. The coil is preferably wrapped around the exterior of the tube. Motion of the structure to which the harvester is mounted causes the magnet to move with respect to the coil, thereby producing an electrical current in the coil. The use of a ferrofluidic bearing gives the power source a very high sensitivity to motion: the bearing reduces the friction experienced by the magnet to a very low level, such that even a small amount of random motion by the structure is converted to electrical power.

The closed tube may be non-circular (preferably linear) or circular. In one embodiment of a "non-circular power harvester", a linear tube having a coil wrapped around it contains one or more magnets and a ferrofluidic bearing, preferably between recoil end magnets positioned at either end; the magnets move with respect to the coil when the structure is in motion. For a circular power harvester, the closed tube is circular and encircles and rotates with the movable structure. One or more magnets and a ferrofluidic bearing are enclosed within the tube, such that the magnets move with respect to the coil wrapped around the outside of the tube when the structure is moving.

Further features and advantages of the invention will be apparent to those skilled in the art from the following detailed description, taken together with the accompanying drawings.

DETAILED DESCRIPTION OF THE INVENTION

Figure 1:
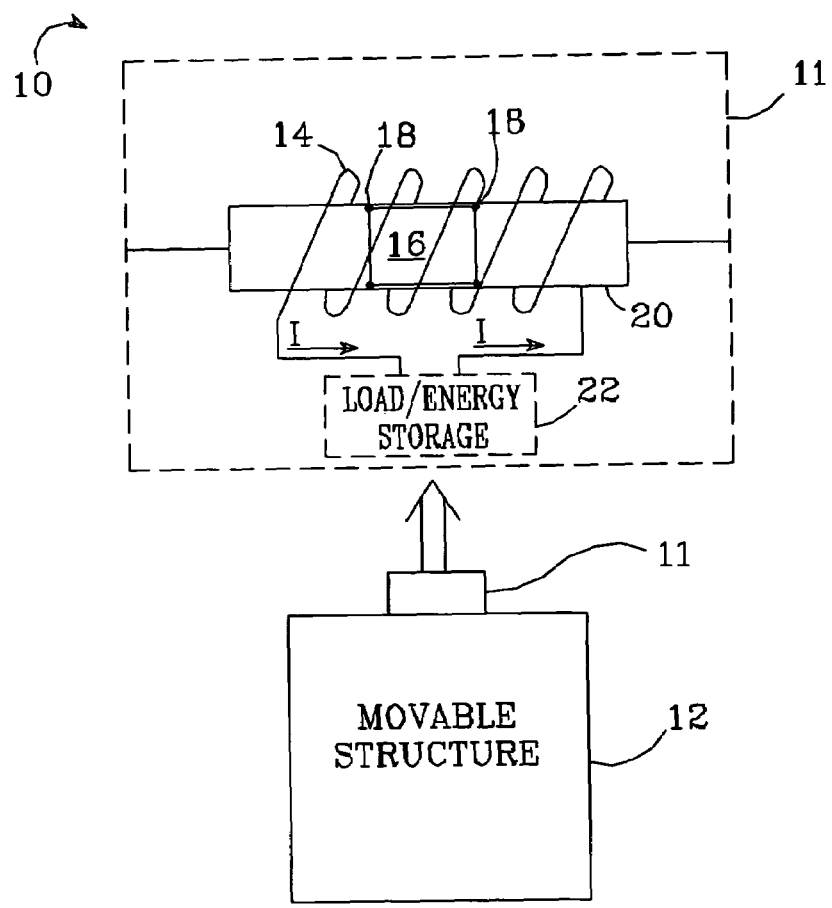
FIG. 1 is a diagram illustrating the basic principles of the present autonomous power source.

The present invention is an autonomous power source which converts motion into stored energy; as such, it is particularly well-suited for use as a self-contained power source on a moving vehicle. The basic principles of the invention are illustrated in FIG. 1. An autonomous power source 10 comprises a power harvester 11 mounted onto a movable structure 12 such that it moves with the structure. The power harvester includes at least one conductive coil 14 (typically copper), at least one magnet 16, and a low-friction ferrofluidic bearing 18 in contact with the magnet. In the embodiment shown in FIG. 1, magnet 16 and bearing 18 are enclosed within a nonmagnetic closed tube 20, and coil 14 wraps around the exterior of the tube such that magnet 16 moves with respect to coil 14 as it moves within tube 20. A ferrofluid introduced into tube 20 is naturally attracted to the poles of magnet 16 to form beads 18 around the end poles of the magnet. This provides an ultra low friction lubricant that allows magnet 16 to freely move within tube 20, which provides a supporting structure for the magnet.

The coil, magnet and bearing are arranged such that the magnet and coil move with respect to each other when structure 12 is in motion, thereby producing an electrical current in coil 14. In the embodiment shown, magnet 16 moves back and forth with respect to fixed coil 14 to produce a current I in the coil. Current I can be used to power a load directly; however, in most applications, the energy produced by the power harvester is stored in an energy storage system 22 such as a rechargeable battery. Interface circuitry (not shown), such as a rectifier circuit, may be used to process current I before it is stored.

The use of a low-friction ferrofluidic bearing increases the power source's sensitivity to motion to a practical level. With this increased sensitivity, virtually any type of motion—e.g., rotary motion, random motion, motion due to vibration—causes the magnet and coil to move with respect to each other such that current is generated. The present power source can be mounted on, for example, the wheel of a vehicle, and when properly arranged, generate energy sufficient to charge a battery which powers electronic circuitry. Another possible application of the present power source might be on an ocean buoy, which could use a power harvester as described herein to convert the motion of the buoy to an electrical current capable of powering electronic circuitry mounted on the buoy.

Figure 2:
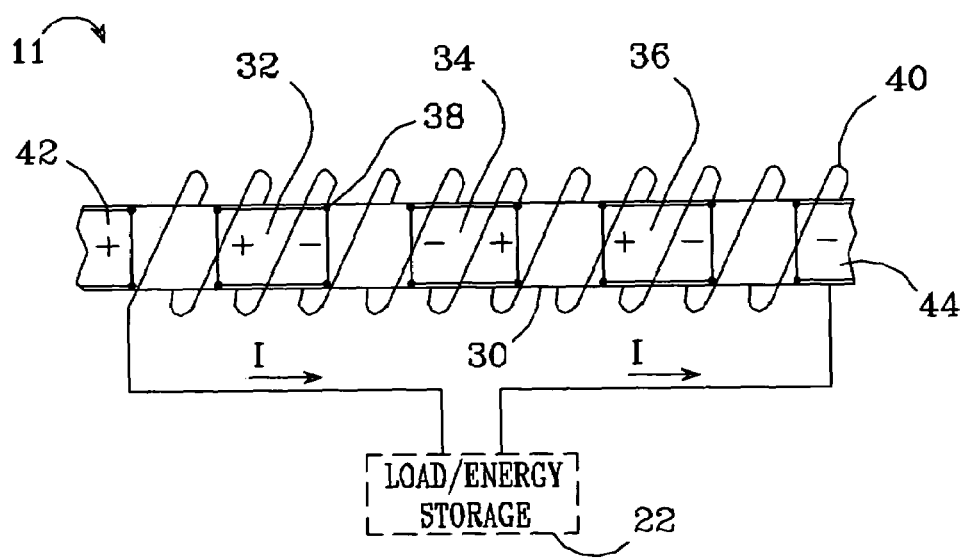
FIG. 2 is a diagram of a non-circular power harvester per the present invention.

One preferred implementation of power harvester 11 is shown in FIG. 2, which is referred to as a non-circular power harvester. A closed nonmagnetic non-circular tube 30, preferably a linear tube, contains a plurality of magnets 32, 34, 36 and a ferrofluidic bearing (beads 38), and a conductive coil 40 wraps around the exterior of the tube such that magnets 32, 34 and 36 move with respect to coil 40 as they move within tube 30. Using multiple magnets in this way acts to increase the current I produced in coil 40. As before, the energy produced by the power harvester may be stored in an energy storage system 22 such as a rechargeable battery.

The preferred non-circular harvester preferably includes recoil end magnets 42, 44 at either end of the tube. The end magnets are oriented such that their polarities are the same as those of the sliding magnets to which they are adjacent. For example, in FIG. 2, end magnet 42 is oriented to present a positive polarity to the positive end of adjacent magnet 32. Similarly, end magnet 44 is oriented to present a negative polarity to the negative end of adjacent magnet 36. In this way, the end magnets act to repel their adjacent magnets when the sliding magnets come into close proximity to the end magnets, further increasing the sliding magnets' motion and increasing output current.

When multiple sliding magnets are contained within non-circular tube 30, they are preferably arranged such that each magnet is separated from its adjacent magnets by a gap maintained by magnetic repulsion. This is done by orienting the sliding magnets such that like polarities are adjacent to each other (as shown in FIG. 2). This arrangement helps to space the sliding magnets approximately equally along the length of the non-circular tube 30. The multiple magnets also act to make the system chaotic, such that even a small amount of random motion results in some motion by at least one of the sliding magnets—and thus some output current. Additional details concerning the use of multiple magnets in a non-circular power harvester can be found in co-pending patent application Ser. No. 10/078,176, entitled "Multiple Magnet Transducer with Differential Magnetic Strengths", and in co-pending patent application Ser. No. 10/077,945, entitled "Multiple Magnet Transducer", both of which are assigned to the assignee of the present invention. The contents of these copending applications are hereby incorporated herein by reference.

Figure 3A:
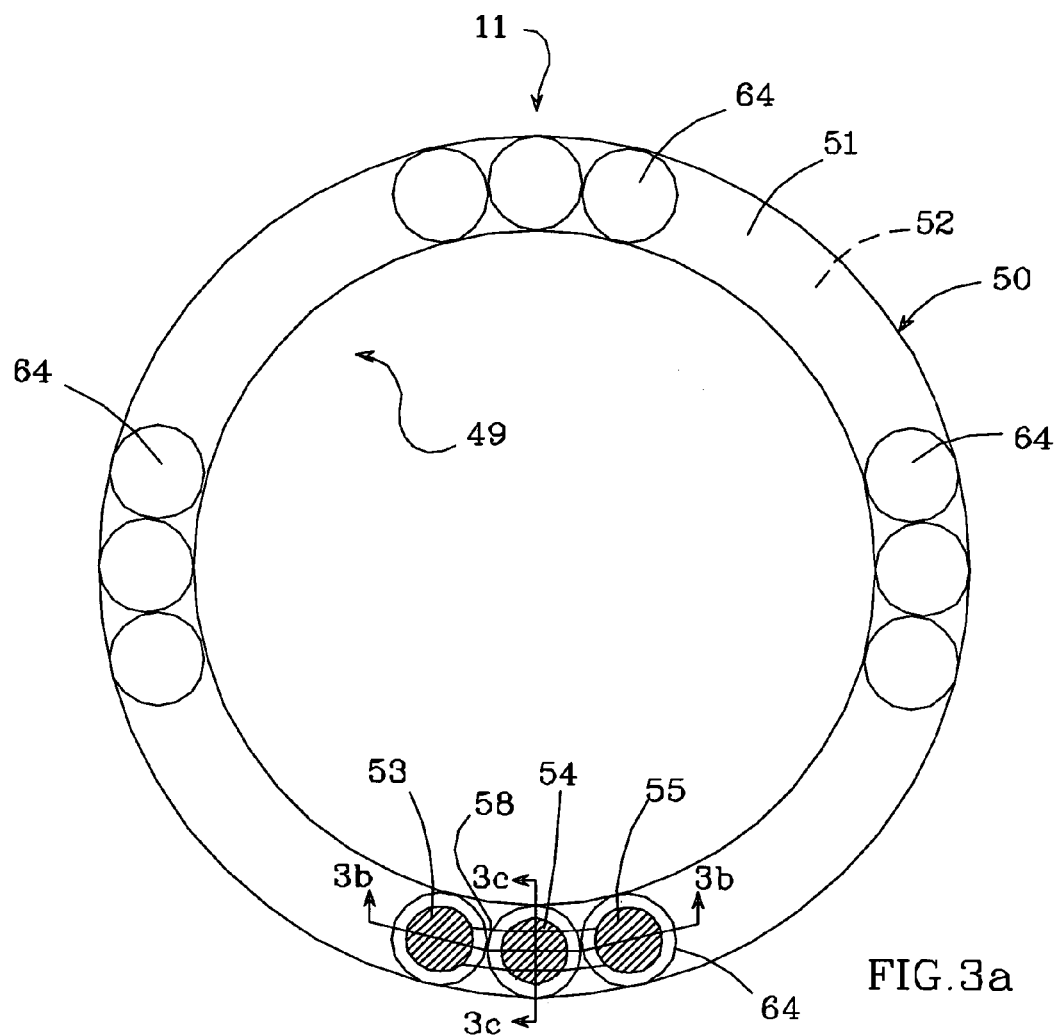
FIG. 3a is a plan view of one embodiment of a circular power harvester per the present invention.
Figure 3B:
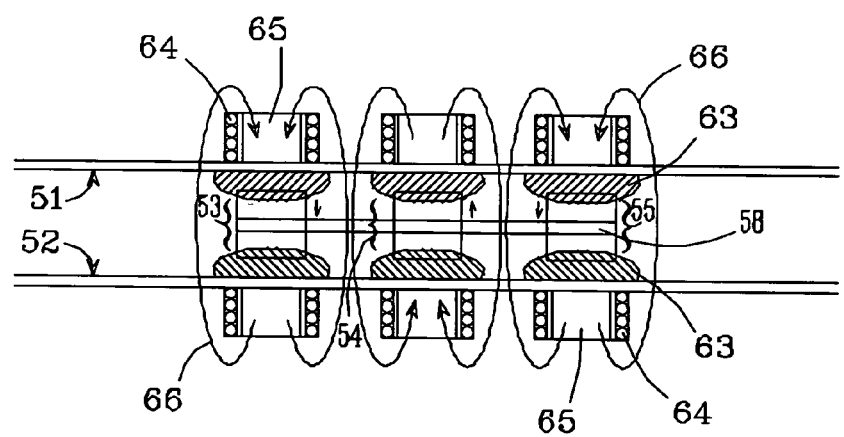
FIG. 3b is a cross-sectional view of the circular power harvester of FIG. 3a, cut along section lines 3b–3b.
Figure 3C:
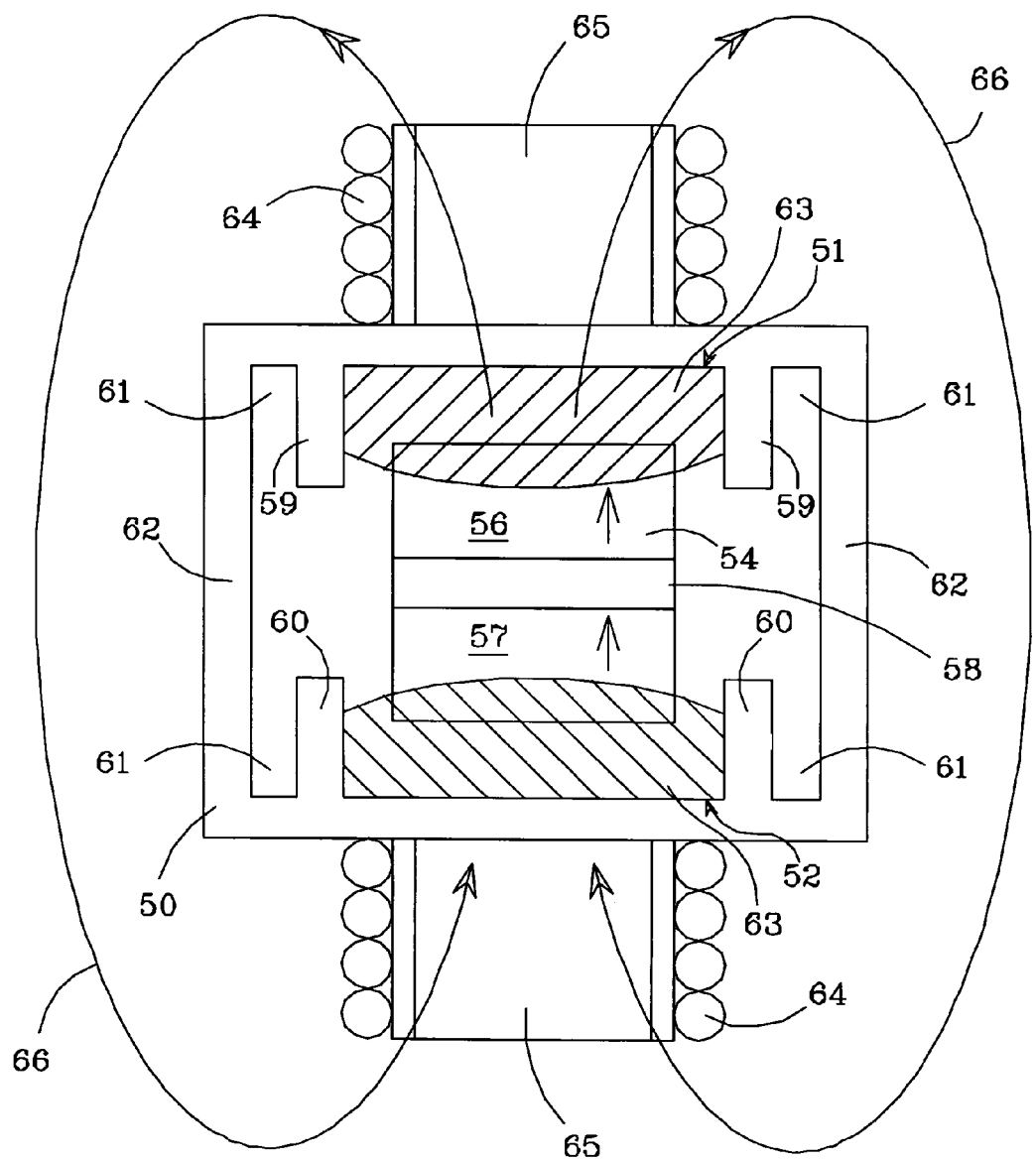
FIG. 3c is a cross-sectional view of the circular power harvester of FIG. 3a, cut along section lines 3c–3c.

Another preferred implementation of power harvester 11 is shown in FIGS. 3a–3c, which is referred to as a circular power harvester 49. A plan view is shown in FIG. 3a, a cross-sectional view along section lines 3b—3b is shown in FIG. 3b, and a cross-sectional view along section lines 3c—3c is shown in FIG. 3c. The harvester comprises a nonmagnetic circular tube 50 which has a rectangular cross-section, with a smooth top and bottom inner surfaces 51 and 52, respectively. The tube contains at least one cylindrical or nearly-cylindrical magnet; three such magnets 53, 54, 55 are shown in FIGS. 3a and 3b. The magnets are placed with their magnetic axes (indicated with arrows) perpendicular to the plane of tube 50, with opposite magnetic polar orientation between adjacent magnets. Each magnet is preferably made from two identical magnets 56, 57 (shown in FIG. 3c) stacked on either side of a spacer 58, with both magnets having the same magnetic orientation. Spacer 58 can be made from magnetic material, such as soft iron, or from non-magnetic material such as aluminum. The height of each magnet stack is slightly less than the distance between top surface 51 and bottom surface 52. Tube 50 preferably includes a top rail 59 (shown in FIG. 3c) that extends from top surface 51, and a bottom rail 60 that extends from bottom surface 52. Rails 59 and 60 serve to confine the magnets' motion to the center of tube 50, as well as to provide finite air gaps 61 between the magnets' side walls and the side walls 62 of tube 50.

A small amount of ferrofluid is applied to the magnet stacks. The ferrofluid engulfs the region with the strongest magnetic field—the north and south poles for the cylindrical or nearly-cylindrical magnets in FIG. 3—to form a liquid cushion 63 upon which the magnet stacks can slide with a negligible amount of friction.

Conductive coils 64, preferably in pairs, are affixed to the top and/or bottom outer surfaces of tube 50, with their center axes along the direction of the magnetic axes but orthogonal to the direction of magnet movement. The interior 65 of each coil is preferably filled with ferrofluid or some other "soft" magnetic material with a low remnant magnetization and coercive energy. Conductive coils 64 should be spaced evenly around tube 50. When multiple magnet stacks are linked via a spacer (as in FIGS. 3a and 3b), there are preferably corresponding groups of coils 64 which have the same angular spacing between adjacent coils within the same group as is present between the linked magnet stacks. This ensures that the outputs of all coils in the same group are in phase electrically, which makes the power extraction and conditioning circuits simpler and more cost effective. The circular power harvester's power output increases with the number of coils used, and with the speed of rotation.

In operation, circular tube 50 is mounted to a rotatable structure such as the wheel of a vehicle, such that it encircles and rotates with the structure. As the structure rotates, the magnet stacks (53,54,55) will remain stationary (relative to the tube) or move at a very low velocity, due to the negligible friction provided by ferrofluid cushion 63. As coils 64 rotate past the magnet stacks, the magnetic flux 66 is directed outward along the highly permeable path of ferrofluid cushion 63 and the magnetic materials contained within the coils. This causes a current to be produced in coils 64, which can be used to power a load directly, or can be converted to power and stored in an energy storage system such as a rechargeable battery.

Though only one magnet stack (53,54,55) may be employed, more than one stack is preferred. The voltage produced across the coil(s) as it cuts through the magnetic field is proportional to dB/dt. Therefore, multiple magnet stacks—with the polarity of adjacent stacks being opposite to each other—produces a greater voltage as the magnetic field switches suddenly from positive to negative from one stack to the next. A single stack does not have this effect. Using three stacks as shown in FIGS. 3*a* and 3*b* provides simplicity as well as good performance.

As noted above, the shape of the magnets is cylindrical or nearly-cylindrical. The shape may need to be a "twisted" toroidal cylinder, depending on the clearance and radius of curvature of the channel in which the magnets move.

Figure 4A:
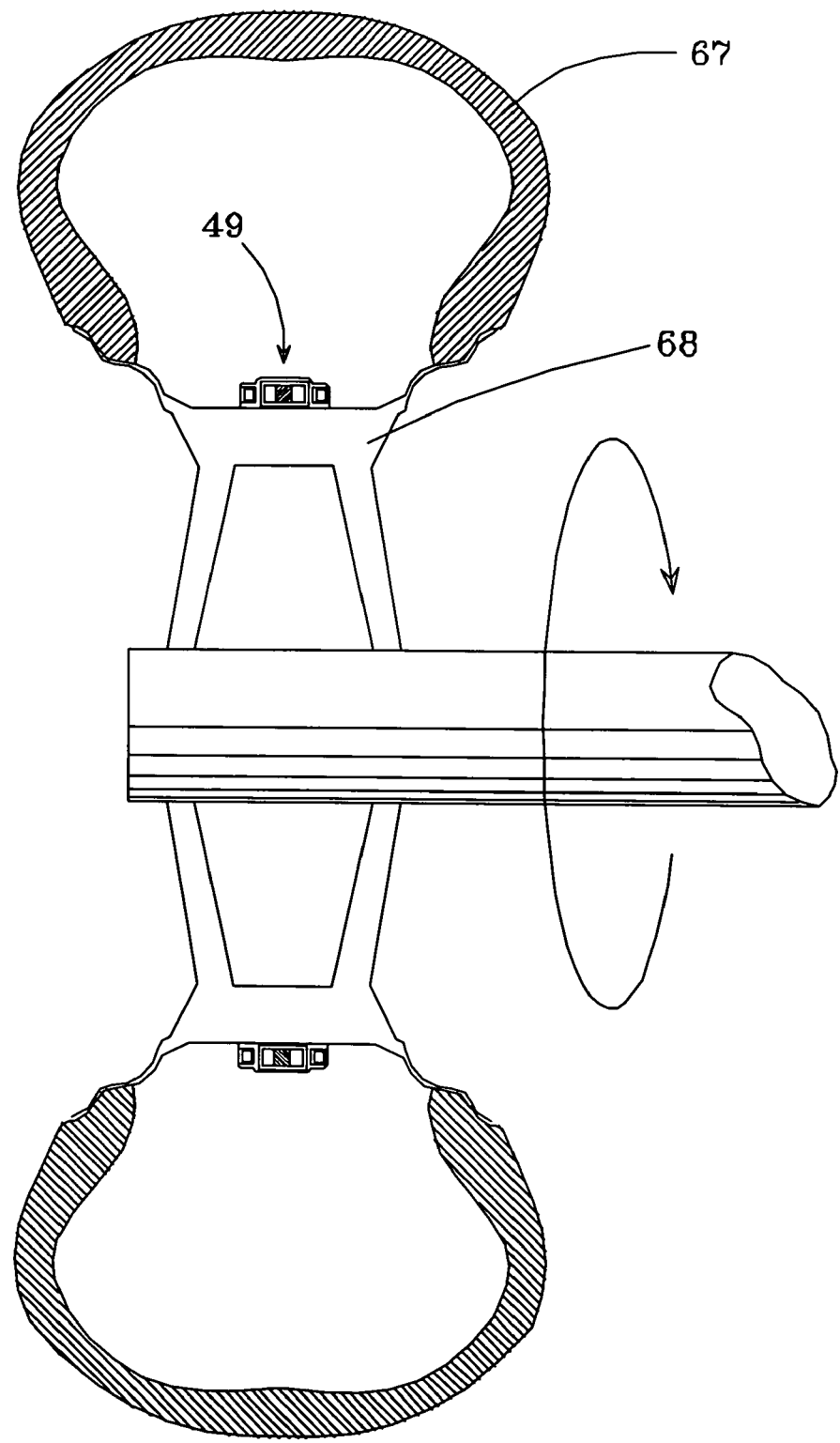
FIG. 4a is a diagram of one embodiment of a circular power harvester as might be used in a tire pressure monitoring application.
Figure 4B:
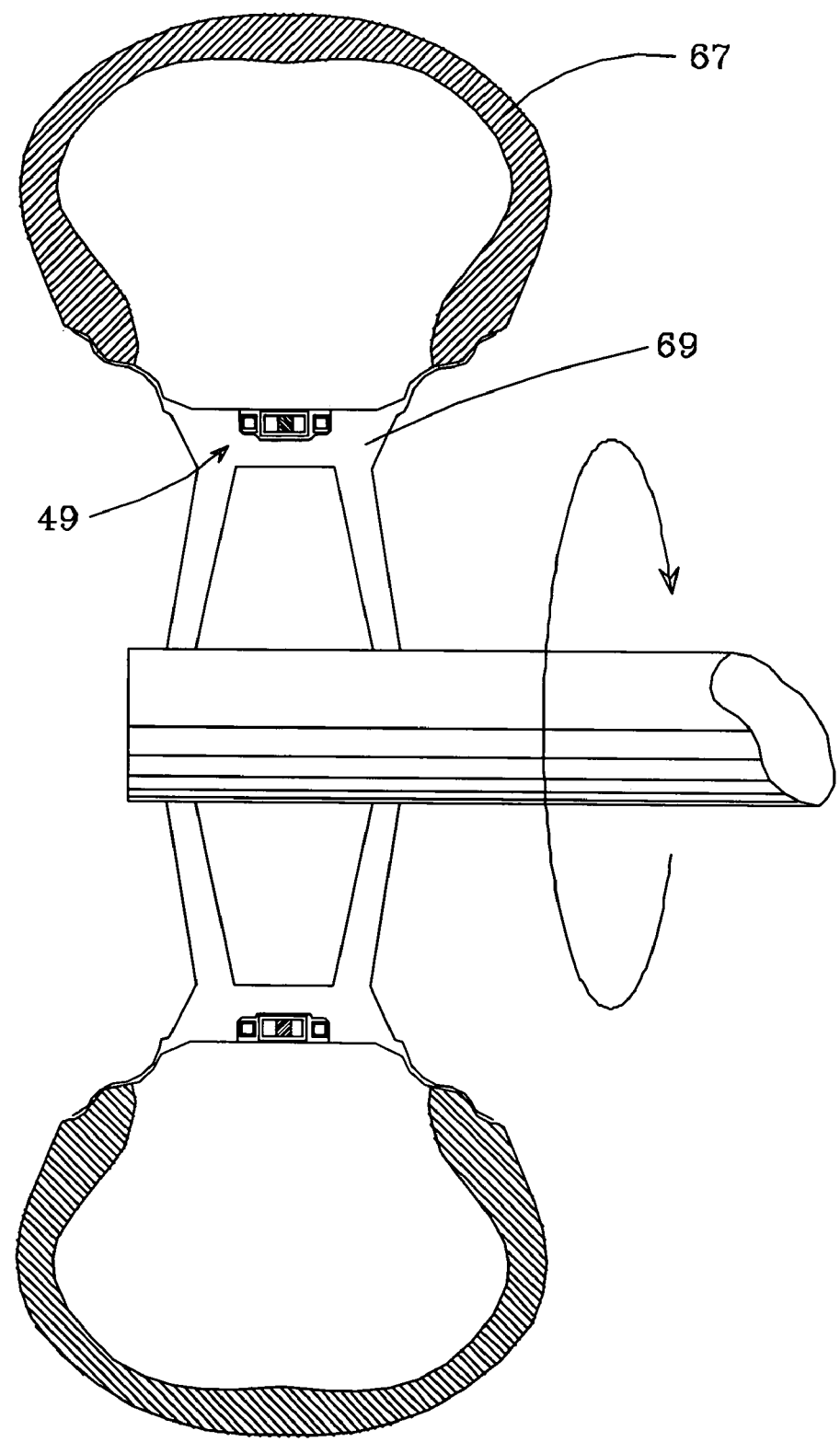
FIG. 4b is a diagram of another embodiment of a circular power harvester as might be used in a tire pressure monitoring application.

The circular power harvester 49 is suitably mounted, for example, on the inside of a tire casing 67 on the body of a wheel 68; this is illustrated in FIG. 4*a*. Alternatively, the harvester might be integrated into the body of a wheel 69 as shown in FIG. 4*b*. The latter approach may be advantageous for wheels made of non-ferrous alloys, since no extensive magnetic shielding would be required. Other advantages of the integrated approach include preventing theft, reduced damage from exposure to the environment, and avoiding interference with mounting and removing tires.

Figure 5:
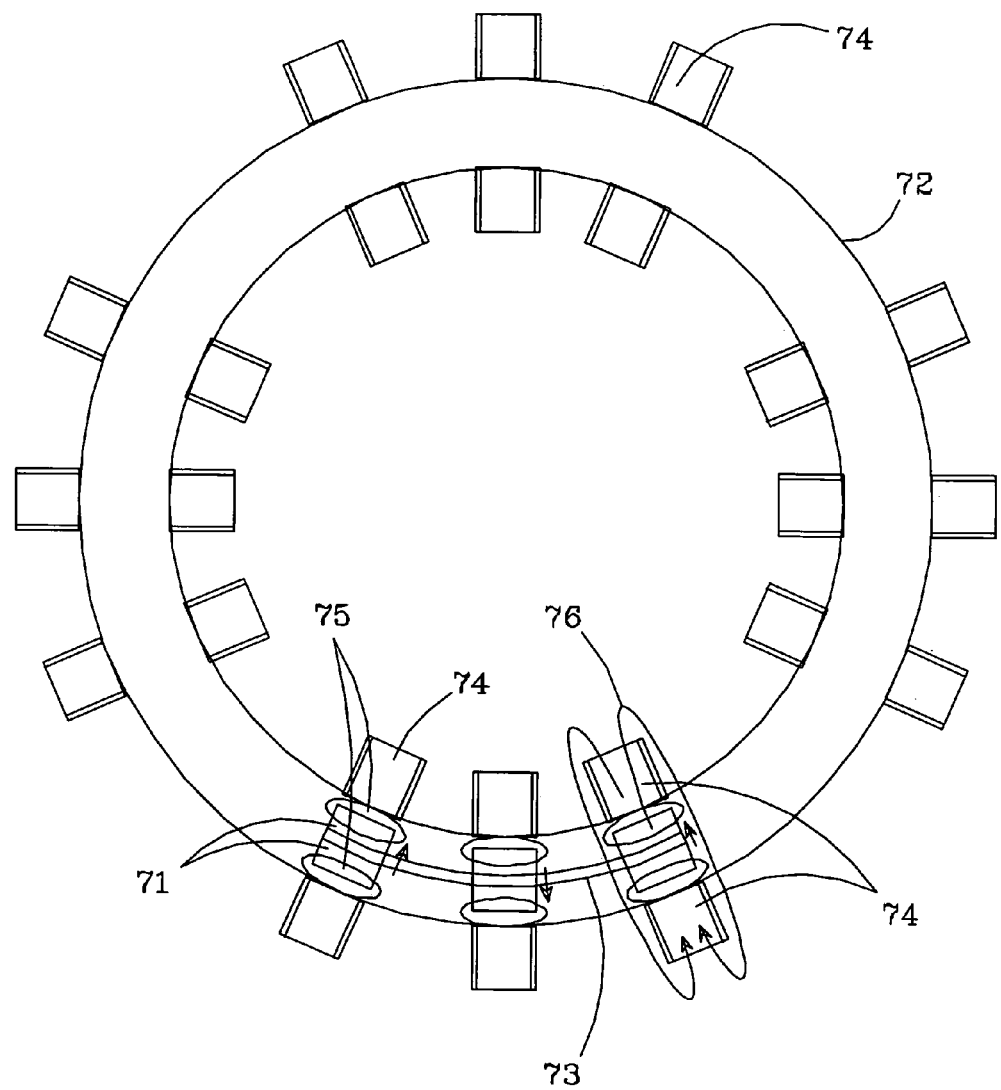
FIG. 5 is a plan view of another embodiment of a circular power harvester per the present invention.

An alternative embodiment of a circular power harvester 70 in accordance with the present invention is shown in FIG. 5. Here, the magnet stacks 71 are similar to those described in connection with FIGS. 3*a* and 3*b*, except that the stacks are placed such that their magnetic axes point toward the radial direction of the circular tube 72. If multiple stacks are employed, they are preferably linked by a spacer 73, which preferably is curved such that it has a curvature equal to the average curvature of the tube's inside and outside diameters. Here, conductive coils 74, preferably filled with ferrofluid or some other soft magnetic material, are affixed to the inside and output diameters of circular tube 72. Ferrofluid is applied to the magnet stacks, which engulfs the stacks' north and south poles to form a liquid cushion 75 upon which the stacks can slide with a negligible amount of friction.

Operation is similar to the harvester of FIG. 3*a*–3*c*: circular tube 72 is mounted to a rotatable structure such that it encircles and rotates with the structure. As the structure rotates, magnet stacks 71 remain stationary or nearly stationary (relative to the tube) due to the force of gravity and ferrofluid cushion 75. As coils 74 rotate past the magnet stacks, magnetic flux 76 is directed outward along the highly permeable path of ferrofluid cushion 75 and the magnetic materials contained within the coils, causing a current to be produced in coils 74.

As with the harvester of FIGS. 3*a*–3*c*, groups of coils 74 preferably have the same angular spacing between adjacent coils within the same group as is present between the linked magnet stacks, to ensure that the outputs of all coils within the group are in phase electrically.

The embodiment shown in FIG. 5 has an advantage over that in FIGS. 3*a*–3*c*, in that its ferrofluidic cushion tends to be thicker, due to the contacting area between magnet and tube being larger in FIG. 5 than in FIGS. 3*a*–3*c*. As the circular tube rotates, it exerts a centrifugal force on the magnets and compresses the ferrofluid cushion. A thicker cushion is advantageous since it can take more centrifugal force without being squashed completely, and thus retains its low friction characteristics even at high rotational speed.

To enable a highly sensitive response of the magnets to motion, ferrofluid bearings are employed as an interface between the magnets and their support structure. Ferrofluids are dispersions of finely divided magnetic or magnetizable particles, generally ranging between about 30 and 150 Angstroms in size, and dispersed in a liquid carrier. The magnetic particles are typically covered with surfactants or a dispersing agent. The surfactants assure a permanent distance between the magnetic particles to overcome the forces of attraction caused by Van der Waal forces and magnetic interaction, and also provide a chemical composition on the outer layer of the covered particles which is compatible with the liquid carrier and the chemicals in the surrounding environment. Ferrites and ferric oxides employed as magnetic particles offer a number of physical and chemical properties to the ferrofluid, including saturation magnetization, viscosity, magnetic stability, and chemical stability. Several types of ferrofluids are provided by Ferrotec (USA) Corporation of Nashua, N.H. A summary of patents related to the preparation of ferrofluids is provided in U.S. Pat. No. 6,056,889. Additional details concerning the use of ferrofluid bearings in a moving magnet electrical generator as described herein can be found, for example, in copending patent application Ser. No. 10/078,724, entitled "Electrical Generator With Ferrofluid Bearings", assigned to Innovative Technology Licensing, LLC, the assignee of the present invention. The contents of this copending application are hereby incorporated herein by reference.

The characteristics of the ferrofluid and the sliding magnets are related. If the magnets have a relatively low magnetic field, a ferrofluid of relatively high magnetization should be used. Each magnet's magnetic field will typically range from about 500–4,000 Gauss, and the magnetization of the ferrofluid from about 50–400 Gauss. A preferred ferrofluid composition for the present invention has a viscosity substantially less than 5 cp, actually less than 2 cp, and achieves an ultra low coefficient of static friction in the range of 0.0008–0.0012. The composition comprises a mixture of one part Ferrotec (USA) Corporation EFH1 light mineral oil ferrofluid, mixed with from two to four parts of isoparaffinic acid, stirred for 24 hours. Suitable sources of isoparaffinic acid are Isopar 6 and Isopar M hydrocarbonrfluids from Exxon Mobil Chemical Corp. Undiluted EFH1 ferrofluid could also be used. Undiluted EFH1 composition has a greater weight bearing capacity than the diluted version, but diluting the composition will retain sufficient weight bearing capability for most applications. Other ferrofluids with static friction coefficients up to about 0.02 could also be used, such as Ferrotec (USA) Corporation type EMG 805, a water based ferrofluid with a static friction coefficient of about 0.01 and a viscosity of about 5 cp, since the power output achievable with a 0.01 static friction coefficient is still about 75% that achievable with a near-zero friction system.

The tubes shown in FIGS. 1–5 are preferably hermetically sealed, to avoid the vaporization of any of the ferrofluid within.

Figure 6:
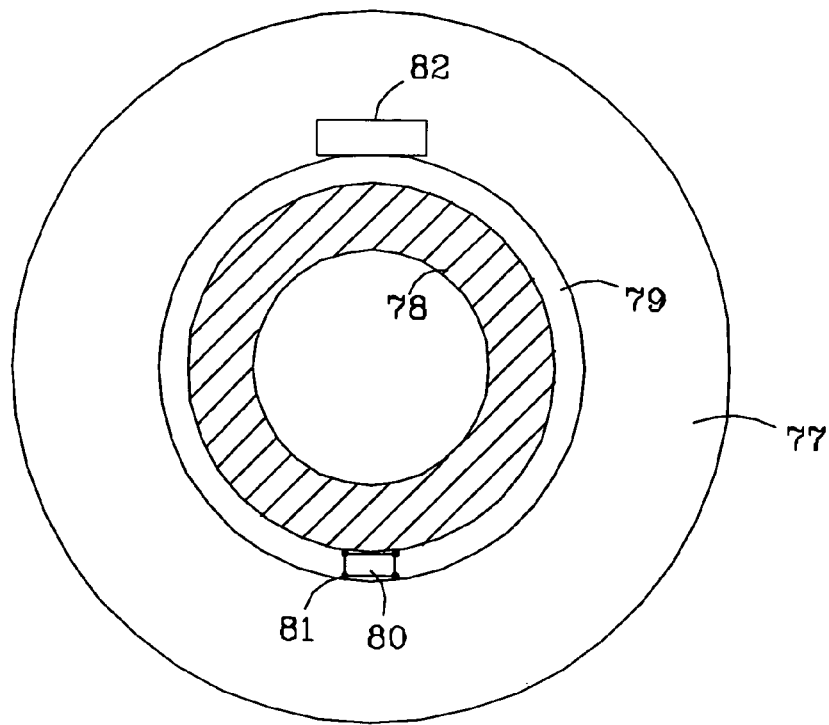
FIG. 6 is a diagram of another embodiment of a circular power harvester per the present invention as might be used in a tire pressure monitoring system.
Figure 7:
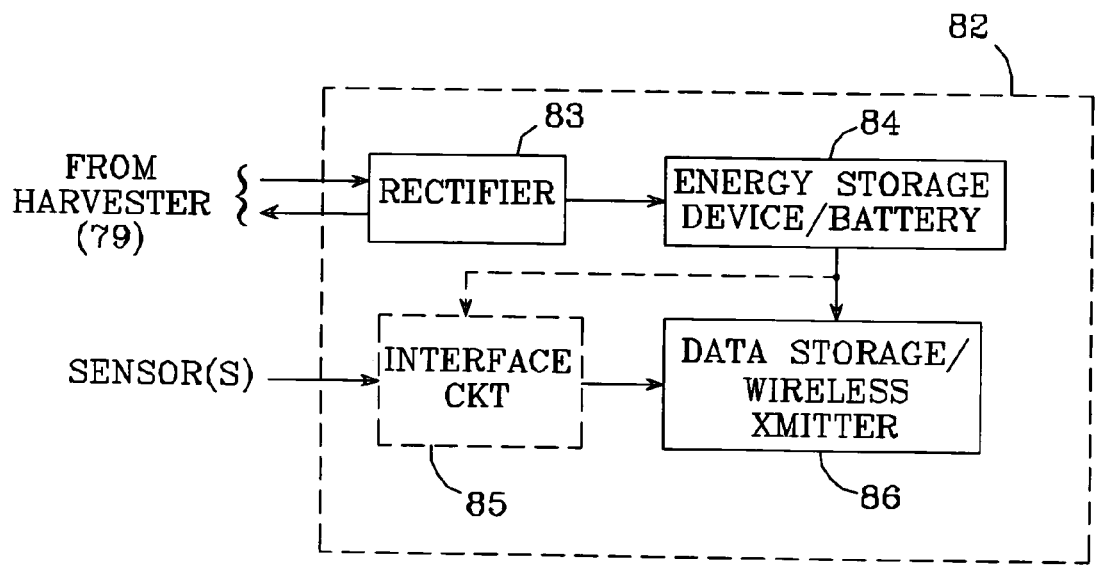
FIG. 7 is a block diagram of an electronics package as might be used with the present autonomous power source.

The present autonomous power source is suitably employed in a tire pressure monitoring system. An example of such a system in shown in FIGS. 6 and 7. In FIG. 6, a tire casing 77 is mounted on a vehicle wheel 78. A circular power harvester 79 (shown here in simplified form) encircles and rotates with wheel 78, with one or more magnets 80 and a ferrofluidic bearing 81 enclosed within. An electronics package 82 is also mounted within tire casing 77; a block diagram of one possible embodiment of the electronics package is shown in FIG. 7. Current produced in the coil of circular power harvester 79 is processed by, for example, a rectifier circuit 83, and stored in an energy storage system such as a rechargeable battery 84. One or more sensors provide outputs which vary with respective tire parameters such as air pressure, temperature, etc. If necessary, these outputs are processed by an interface circuit 85, and are provided to a data storage and/or wireless transmitter circuit 86. Interface circuit 85 and transmitter 86 are powered by energy storage system 84.

In operation, energy storage system 84 is kept charged by the output of power harvester 79, which provides output current whenever wheel 78 is moving. The output current is converted to power and stored in energy storage system 84 so that electronics package 82 may function when the vehicle is at rest. The sensor data may be continually transmitted to a remote receiver, or simply stored for later readout. This latter method might be used to reduce the power consumption of the monitoring system. Transmitter 86 might also be a transceiver arranged to, for example, provide sensor output data when queried from an external readout device.

Note that it is not essential that energy storage system 84 be a rechargeable battery. Other energy storage devices and circuits, such as one or more capacitors, might also be employed.

One possible system, arranged as a tire pressure monitoring system, employs an absolute pressure sensor within the tire, the output of which is stored or transmitted to a remote receiver as described above. Then, an atmospheric pressure sensor is employed at the receiver, along with circuitry which receives the absolute and atmospheric pressure signals and computes the gage pressure.

The sensor or sensors are preferably integrated with the interface and data storage/transmitter electronics. For example, a micro-electromechanical (MEM) pressure sensor could be integrated with an interface circuit and a wireless transmitter on a common substrate.

Note that the system shown in FIGS. 6 and 7 might alternatively be adapted for use as an accelerometer. The current produced by circular harvester 79 will oscillate at a period which varies with the distance between coil turns and the velocity of the wheel's rotation. Thus, the harvester's output current could be processed to determine vehicle speed and acceleration. The number of oscillations per unit time could be tracked with a counter register which might be part of the wireless transmitter circuitry described above. The remote receiver might include a microprocessor which receives the oscillation count and computes instantaneous wheel speed and distance traveled.

Alternatively, to save power, the oscillation count could be stored and periodically broadcast to the remote receiver, enabling the computation of average wheel speed. Yet another power-saving alternative would be to transmit oscillation count or computed wheel speed only when a deviation of, say, greater than +/−2% is detected between the current wheel speed and a comparative value determined from historical information, comparisons with signals from other wheels, or input from other drivetrain signals as might be produced by, for example, an anti-lock brake system.

A system which employs an autonomous power source as described herein might include more than one power harvester. For example, a number of circular power harvesters 79 could be mounted around wheel 78 to increase the amount of current generated by the wheel's motion.

Figure 8:
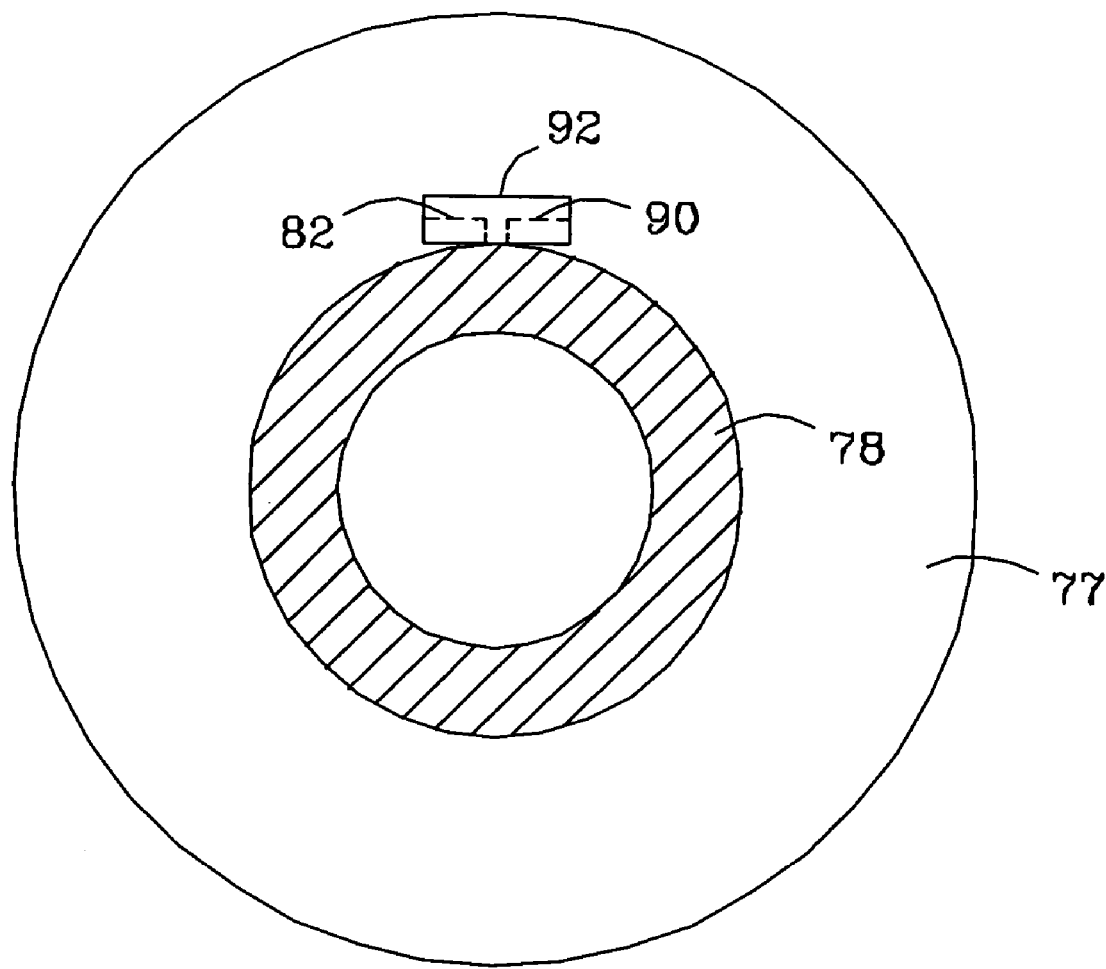
FIG. 8 is a diagram of a non-circular power harvester per the present invention as might be used in a tire pressure monitoring system.

A tire pressure monitoring system might also use a non-circular power harvester; such an arrangement is shown in FIG. 8. Here, tire 77 is mounted on wheel 78, which also supports a non-circular power harvester 90 in accordance with the present invention and which rotates with the wheel. Power harvester 90 is preferably housed within an enclosure 92 that also includes an electronics package such as package 82. As noted above, the system might include more than one non-circular power harvester to increase the amount of current generated by the wheel's motion.

Figure 9A:
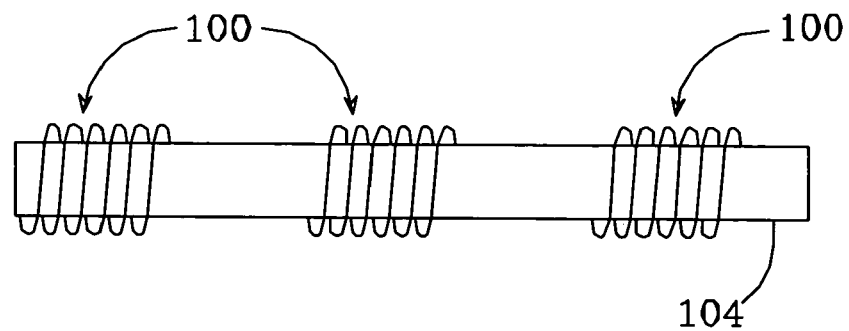
FIG. 9a is a diagram of an alternative coil arrangement for a non-circular power harvester.
Figure 9B:
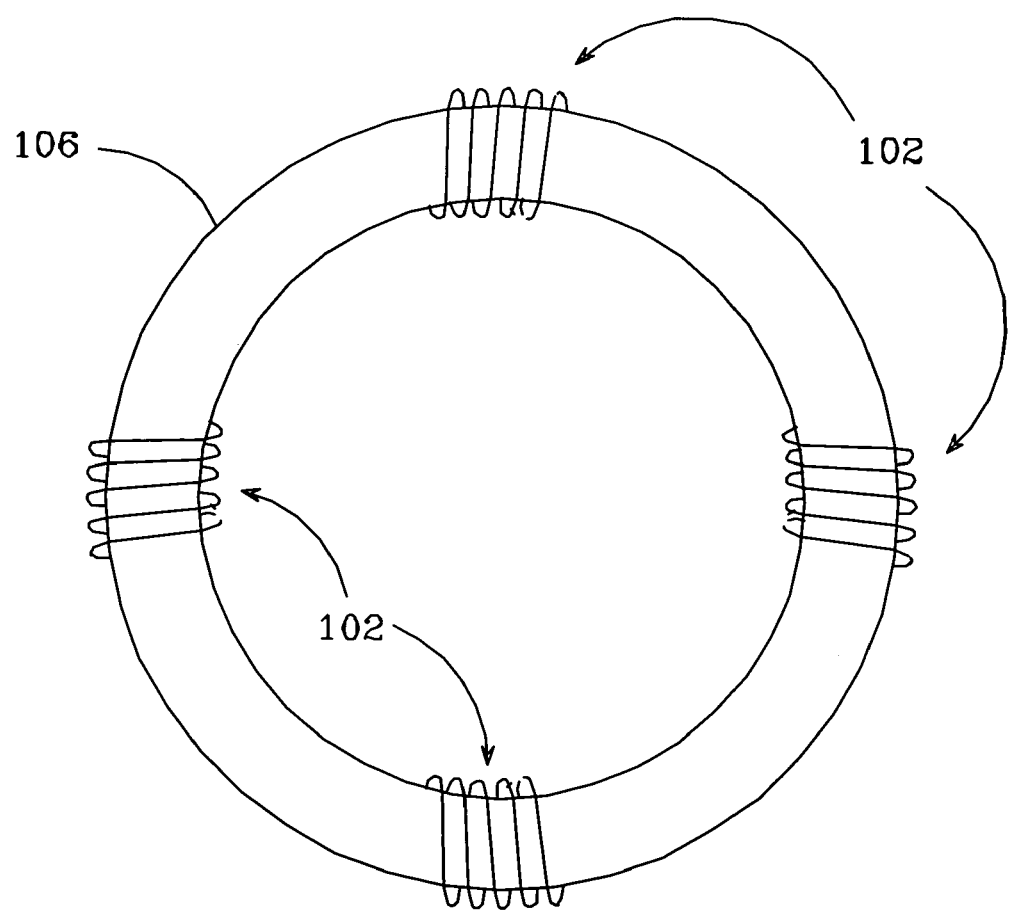
FIG. 9b is a diagram of an alternative coil arrangement for a circular power harvester.

The power harvesters' coils can be implemented in a number of different ways. For example, the coils might be implemented as shown in FIGS. 9a and 9b, in which groups of turns 100, 102 are spaced periodically along a tube 104, 106 (magnets and ferrofluidic bearings not shown). The separate groups might be connected together in series to form one continuous coil, or could be connected together in parallel. This periodically-spaced implementation might be preferred when the system is used as an accelerometer, due to the more clearly periodic nature of the resulting output.

The sliding magnets and tubes described herein preferably have generally circular cross-sections. The dimensions of the components are preferably selected to leave a gap between the ferrofluid beads and the interior tube walls, thereby preventing an air buildup on one side of the sliding magnet and a partial vacuum on the other side that could otherwise develop and retard the magnet's movement. Alternatively, the magnet could be perforated to allow an air flow between its opposite sides if it is desired that (together with the ferrofluid bearings) it occupy the full cross-sectional inner area of the tube.

Figure 10:
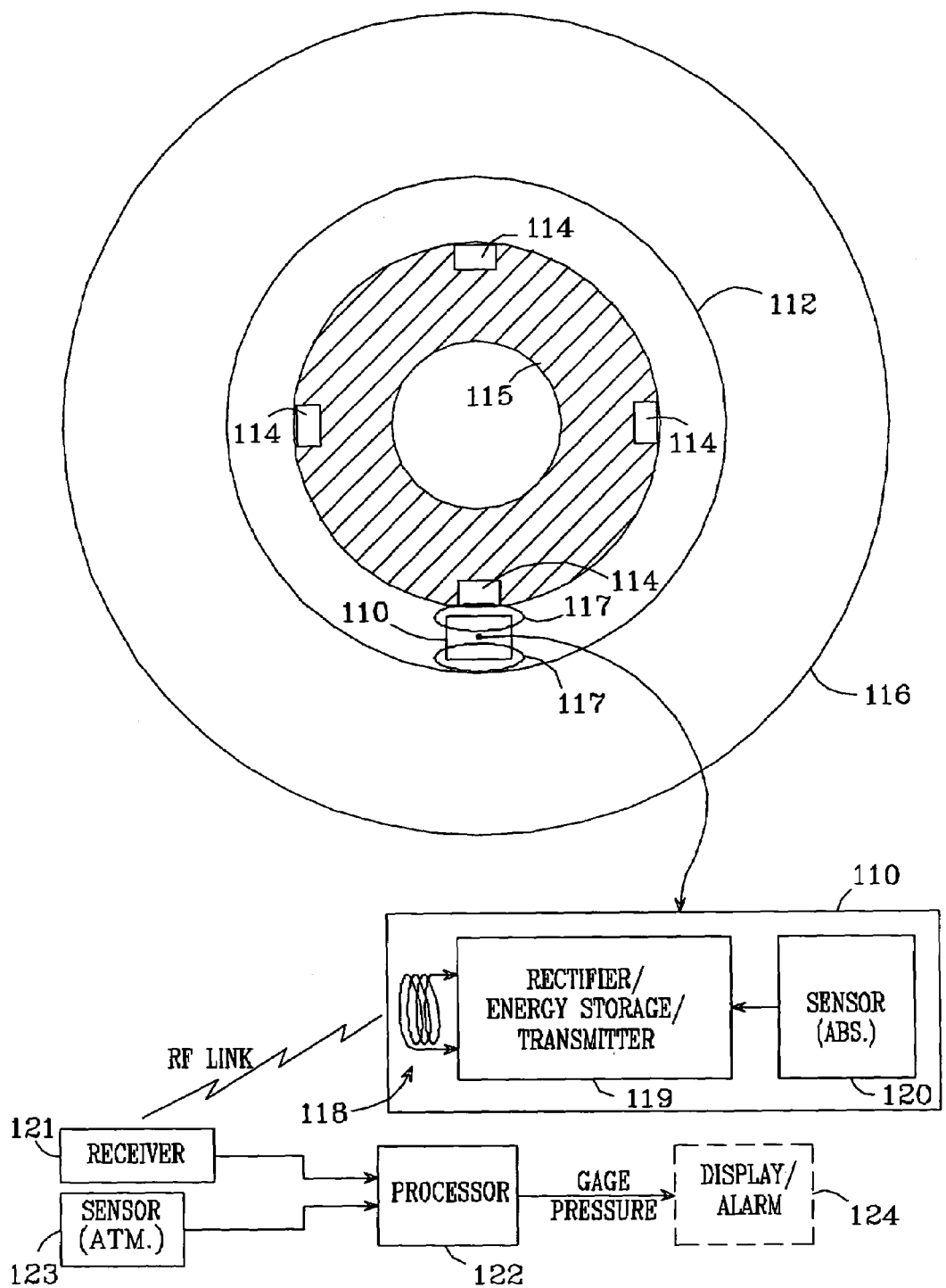
FIG. 10 is a diagram of another embodiment of a circular power harvester per the present invention as might be used in a tire pressure monitoring system.

Another possible implementation for an autonomous power source in accordance with the present invention is shown in FIG. 10. Here, one or more moving coil assemblies 110, each including one or more conductive coils, are placed within nonmagnetic tube 112, and one or more magnets 114 are mounted to a rotatable structure such as a wheel 115. Tube 112 is affixed to the outside of the wheel, within, for example, a tire casing 116. A low-friction ferrofluidic bearing 117 is between coil assembly 110 and the walls of tube 112, to reduce the friction of the sliding moving coil assembly. Magnets 114 are located in close proximity to tube 112, such that the motion of the structure to which tube 112 is mounted causes magnets 114 to move with respect to coil assembly 110 such that an electrical current is produced in the conductive coils. Note that, though only one moving coil assembly 110 is depicted in FIG. 10, assembly 110 might also comprise multiple interconnected moving coil "modules"—each of which includes one or more conductive coils—to increase the current generated by the harvester.

Moving coil assembly 110 preferably includes several components. One or more conductive coils 118 are contained within the assembly, as is an electronic package 119 that includes, for example, interface circuitry such as a rectifier, an energy storage device such as a battery, and a data storage device and/or wireless transmitter. With the electronic circuitry enclosed within tube 112 along with coils 118, no connections to the outside of the tube are required. Electronic package 119 may also include a sensor or sensors 120, which provide data that is stored or transmitted out of tube 112.

For example, the system shown in FIG. 10 could be arranged as a tire pressure monitoring system. Here, sensor 120 is preferably an absolute pressure sensor, the output of which is wirelessly transmitted out of tube 112 via the transmitter portion of electronic package 119. A wireless receiver 121 external to tube 112 receives the transmitted data via an RF link. A processor 122 receives the absolute pressure data, as well as the output of an atmospheric pressure sensor 123. This enables the gage pressure to be determined in order to compensate for changes in altitude and atmospheric pressure. The gage pressure may be provided, for example, to a display 124, which may include an alarm arranged to be triggered by pressure readings that are changing, or are too low or too high.

Figure 11:
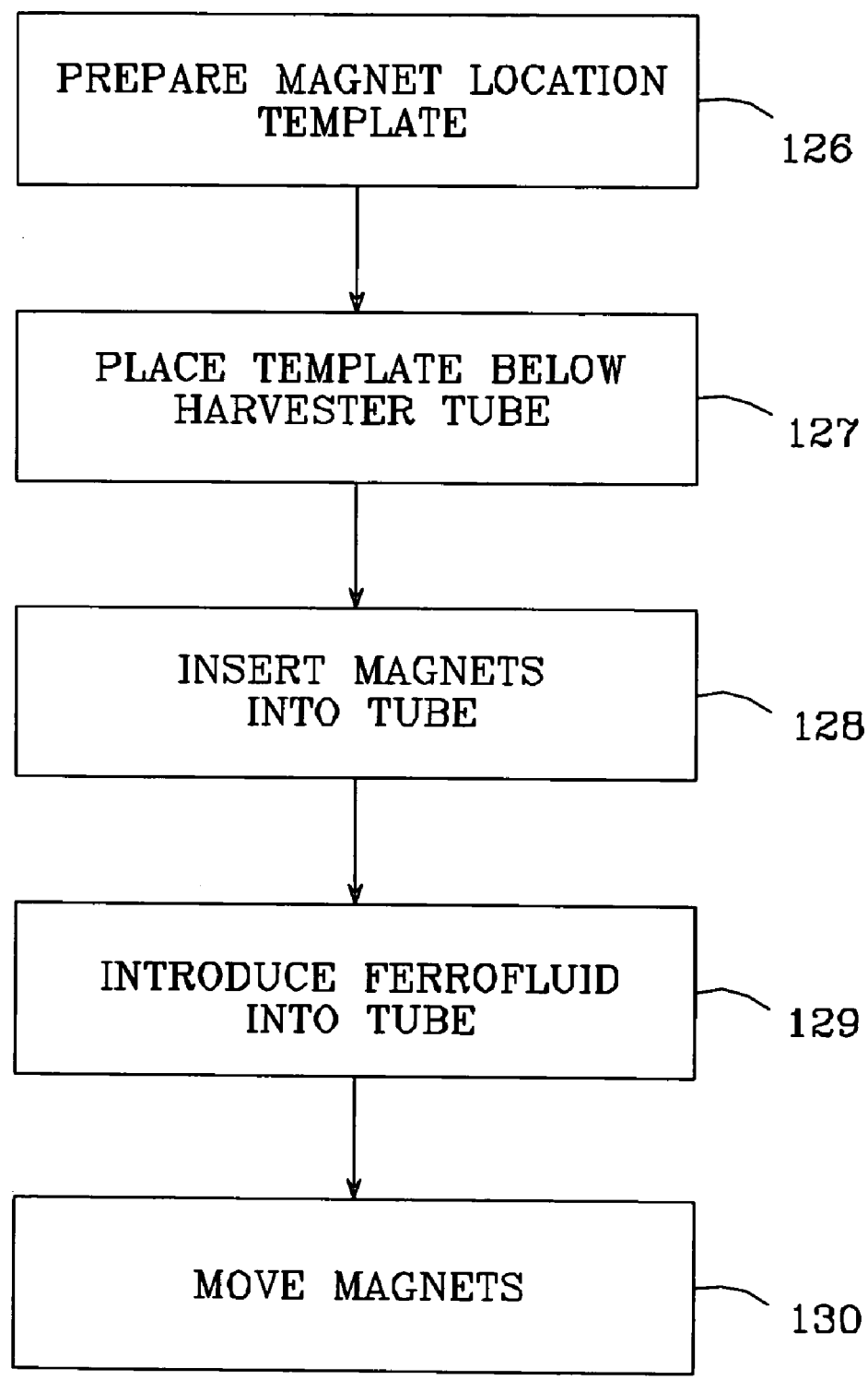
FIG. 11 is a flow chart of a power harvester assembly process per the present invention.

A power harvester having multiple magnets enclosed within a closed tube as described herein is suitably assembled in accordance with the procedure shown in FIG. 11. A template is prepared (126), which has magnets affixed in positions that mirror the positions in which harvester magnets are desired, with the template magnets oriented such that their polarities are opposite to those of the harvester magnets they mirror. The template is placed below the harvester's closed tube (127). The harvester's magnets are inserted into the tube (128), and ferrofluid is introduced into the tube (129). The harvester magnets are made to move within the tube (130), which causes the ferrofluid to attach to the magnets and form the required bearing, and aligns the harvester magnets over their respective template magnets.

While particular embodiments of the invention have been shown and described, numerous variations and alternate embodiments will occur to those skilled in the art. Accordingly, it is intended that the invention be limited only in terms of the appended claims.

We claim:

1. An autonomous power source, comprising:
   a movable structure;
   a power harvester mounted to said structure such that it moves with said structure, said power harvester comprising:
     a coil,
     a magnet,
     a low-friction ferrofluidic bearing in contact with and supporting one of said coil or magnet,
     said coil, magnet and bearing arranged such that said magnet and said coil move with respect to each other when said structure is in motion such that an electrical current is produced in said coil;
   electronic circuitry;
   an energy storage system connected to power said electronic circuitry; and
   an interface circuit connected to receive said electrical current and to provide energy for storage in said energy storage system;
   wherein said electronic circuitry comprises a sensor and a wireless transmitter which transmits a signal that varies with the output of said sensor.

2. The power source of claim 1, further comprising a wireless receiver external to said movable structure which receives said transmitted signal.

3. An autonomous power source, comprising:
   a movable structure;
   a power harvester mounted to said structure such that it moves with said structure, said power harvester comprising:
     a coil,
     a magnet,
     a low-friction ferrofluidic bearing in contact with and supporting one of said coil or magnet,
     said coil, magnet and bearing arranged such that said magnet and said coil move with respect to each other when said structure is in motion such that an electrical current is produced in said coil;
   electronic circuitry;
   an energy storage system connected to power said electronic circuitry; and
   an interface circuit connected to receive said electrical current and to provide energy for storage in said energy storage system;
   wherein said electronic circuitry comprises a sensor and a data storage device which stores data that varies with the output of said sensor.

4. An autonomous power source, comprising:
   a movable structure;
   a power harvester mounted to said structure such that it moves with said structure, said power harvester comprising:
     a coil,
     a magnet,
     a low-friction ferrofluidic bearing in contact with and supporting one of said coil or magnet,
     said coil, magnet and bearing arranged such that said magnet and said coil move with respect to each other when said structure is in motion such that an electrical current is produced in said coil;
   electronic circuitry;
   an energy storage system connected to power said electronic circuitry; and
   an interface circuit connected to receive said electrical current and to provide energy for storage in said energy storage system;
   wherein said electronic circuitry comprises a sensor and a wireless transceiver which transmits a signal which varies with the output of said sensor.

5. An autonomous power source, comprising:
   a movable structure;
   a power harvester mounted to said structure such that it moves with said structure, said power harvester comprising:
     a coil,
     a magnet,
     a low-friction ferrofluidic bearing in contact with and supporting one of said coil or magnet,
     said coil, magnet and bearing arranged such that said magnet and said coil move with respect to each other when said structure is in motion such that an electrical current is produced in said coil;
   electronic circuitry;
   an energy storage system connected to power said electronic circuitry; and
   an interface circuit connected to receive said electrical current and to provide energy for storage in said energy storage system;
   wherein said electronic circuitry comprises an air pressure sensor.

6. The power source of claim 5, wherein said air pressure sensor is an absolute pressure sensor.

7. The power source of claim 6, further comprising:
a wireless transceiver which transmits a signal which varies with the output of said absolute pressure sensor;
a wireless receiver external to said movable structure which receives said transmitted signal;
an atmospheric pressure sensor external to said movable structure; and
circuitry external to said movable structure connected to receive said transmitted signal and the output of said atmospheric pressure sensor and to compute gage pressure.

8. An autonomous power source, comprising:
a movable structure; and
a power harvester mounted to said structure such that it moves with said structure, said power harvester comprising:
 a closed nonmagnetic tube,
 a coil affixed to the exterior of said tube,
 a magnet, and
 a low-friction ferrofluidic bearing in contact with and supporting one of said coil or magnet, said magnet and bearing enclosed within said tube such that said magnet is in contact with and supported by said bearing and is free to move within said tube such that said magnet and said coil move with respect to each other when said movable structure is in motion such that an electrical current is produced in said coil.

9. The power source of claim 8, wherein said movable structure is a vehicle wheel and said closed tube rotates with said wheel.

10. The power source of claim 9, further comprising a tire mounted on said vehicle wheel, said power harvester mounted on an outer surface of said wheel within said tire.

11. The power source of claim 9, further comprising a tire mounted on said vehicle wheel, said power harvester integrated into the body of said wheel.

12. The power source of claim 8, wherein said closed tube is hermetically sealed.

13. The power source of claim 8, wherein said magnet and coil move non-circularly with respect to each other when said movable structure is in motion.

14. The power source of claim 13, wherein said closed tube is a nonmagnetic non-circular tube and said magnet slides between the opposite ends of said tube when said movable structure is in motion.

15. The power source of claim 14, wherein said non-circular tube is a linear tube.

16. The power source of claim 14, further comprising recoil end magnets affixed at opposite ends of said closed non-circular tube, the polarities of said end magnets selected to repel said sliding magnet when it comes into close proximity with said end magnets.

17. The power source of claim 13, wherein said closed tube is a non-circular tube and said power harvester comprises two or more of said magnets, each of which is supported by respective ferrofluidic bearings, said magnets arranged within said tube such that each magnet is separated from its adjacent magnets by a gap maintained by magnetic repulsion and such that said magnets slide between the opposite ends of said tube when said movable structure is in motion.

18. The power source of claim 17, further comprising recoil end magnets affixed at opposite ends of said closed non-circular tube, the polarities of said end magnets selected to repel the sliding magnet adjacent to said end magnet when said sliding magnet comes into close proximity with said end magnets.

19. The power source of claim 8, wherein said movable structure is a rotatable structure and said closed tube is a circular tube which encircles and rotates with said structure, said magnet and bearing enclosed within said circular tube such that said magnet moves within said tube when said movable structure is in motion.

20. The power source of claim 19, wherein said circular tube has a rectangular cross-section with top and bottom outer surfaces and smooth top and bottom inner surfaces, which encircles and rotates with said structure, and said power harvester comprises at least one cylindrical or nearly-cylindrical magnet having its magnetic axis perpendicular to the plane of said tube, said coils affixed to the top and/or bottom otter surfaces of said tube with their center axes along the direction of said magnetic axis but orthogonal to the direction of magnet movement.

21. The power source of claim 20, wherein said at least one cylindrical or nearly-cylindrical magnet comprises two magnets stacked on either side of a spacer, with both stacked magnets having the same magnetic orientation.

22. The power source of claim 20, wherein said at least one cylindrical or nearly-cylindrical magnet comprises more than one cylindrical or nearly-cylindrical magnet linked together with a spacer, said linked magnets arranged such that there is opposite magnetic polar orientation between adjacent magnets, each of said linked magnets in contact with and supported by respective low-friction ferrofluidic bearings.

23. The power source of claim 22, wherein said at least one cylindrical or nearly-cylindrical magnet comprises three cylindrical or nearly-cylindrical magnets linked together with said spacer.

24. The power source of claim 22, wherein said at least one cylindrical or nearly-cylindrical magnet comprises n cylindrical magnets linked together with a spacer, said linked magnets having a known angular spacing between adjacent magnets, said coils affixed to said tube in groups of n coils, with the coils of each group arranged such that they have said known angular spacing between adjacent coils such that the outputs of all coils in a group will be in phase electrically.

25. The power source of claim 20, wherein top and bottom rails extend from said top and bottom inner surfaces, respectively, and confine the motion of said at least one cylindrical or nearly-cylindrical magnet to the center of said tube and provide finite air gaps between the magnets' side walls and the side walls of said tube.

26. The power source of claim 20, wherein said coils are affixed to said tube in pairs, with each pair's first coil on said top outer surface and each pair's second coil directly below said first coil on said bottom outer surface.

27. The power source of claim 20, wherein said coils are filled with a soft magnetic material with a low remnant magnetization and coercive energy.

28. The power source of claim 19, wherein said power harvester comprises at least one cylindrical or nearly-cylindrical magnet having its magnetic axis point toward the radial direction of said tube, said coils affixed to the inside and outside diameters of said tube.

29. The power source of claim 28, wherein said at least one cylindrical or nearly-cylindrical magnet comprises more than one cylindrical or nearly-cylindrical magnet linked together with a spacer, said linked magnets arranged such that there is opposite magnetic polar orientation between adjacent magnets, said spacer curved such that it has a curvature equal to the average curvature of said tube's inside and outside diameters, each of said linked magnets in contact with and supported by respective low-friction ferrofluidic bearings.

30. The power source of claim 29, wherein said at least one cylindrical or nearly-cylindrical magnet comprises n cylindrical or nearly-cylindrical magnets linked together with a spacer, said linked magnets having a known angular spacing between adjacent magnets, said coils affixed to said tube in groups of n coils, with the coils of each group arranged such that they have said known angular spacing between adjacent coils such that the outputs of all coils in a group will be in phase electrically.

31. The power source of claim 28, wherein said coils are affixed to said tube in pairs, with each pair's first coil on said tube's outside diameter and each pair's second coil directly opposite said first coil on said tube's inside diameter.

32. The power source of claim 28, wherein said coils are filled with a soft magnetic material with a low remnant magnetization and coercive energy.

33. An autonomous power source, comprising:
    a movable structure; and
    a power harvester mounted to said structure such that it moves with said structure, said power harvester comprising:
        a coil,
        a magnet,
        a low-friction ferrofluidic bearing in contact with and supporting one of said coil or magnet,
        said coil, magnet and bearing arranged such that said magnet and said coil move with respect to each other when said structure is in motion such that an electrical current is produced in said coil;
    wherein said movable structure is a rotatable structure and said power harvester further comprises a closed nonmagnetic circular tube which encircles and rotates with said structure, said coil and bearing enclosed within said circular tube such that said coil is in contact with and supported by said bearing and is free to move within said tube when said structure is in motion, said magnet mounted to said structure outside of said tube such that said magnet and said coil move with respect to each other when said structure is in motion such that an electrical current is produced in said coil.

34. The power source of claim 33, further comprising an electronics package located within said tube and coupled to said coil, said electronics package comprising:
    electronic circuitry;
    an energy storage system connected to power said electronic circuitry;
    an interface circuit connected to receive said electrical current from said coil and to provide energy for storage in said energy storage system;
    a sensor; and
    a wireless transmitter which transmits a signal that varies with the output of said sensor.

35. The power source of claim 34, further comprising a wireless receiver external to said structure which receives said transmitted signal.

36. The power source of claim 34, wherein said sensor comprises an absolute pressure sensor.

37. The power source of claim 36, further comprising:
    a wireless receiver external to said movable structure which receives said transmitted signal;
    an atmospheric pressure sensor external to said movable structure; and
    circuitry external to said movable structure connected to receive said wirelessly transmitted signal and the output of said atmospheric pressure sensor and to compute gage pressure.

38. The power source of claim 37, wherein said circuitry is further arranged to display said computed gage pressure.

39. The power source of claim 33, further comprising additional coils interconnected to said coil, each of said additional coils enclosed within said circular tube and in contact with and supported by a respective low-friction ferrofluidic bearing such it is free to move within said tube when said movable structure is in motion.

40. A wireless tire pressure monitoring system, comprising:
    an autonomous power source, comprising:
        a power harvester mounted to a vehicle wheel such that it rotates with said wheel, said power harvester comprising:
            a coil,
            a magnet,
            a low-friction ferrofluidic bearing in contact with and supporting said magnet,
            said coil, magnet and bearing arranged such that said magnet and said coil move with respect to each other when said wheel is in motion such that an electrical current is produced in said coil;
        an air pressure sensor for sensing the air pressure within a tire mounted on said wheel;
        a data storage and/or wireless transmitter circuit which stores and/or transmits data which varies with said sensor output;
        a rechargeable battery connected to power said circuit; and
        an interface circuit connected to receive said electrical current and to provide energy to recharge said rechargeable battery.

41. The tire pressure system of claim 40, wherein said power harvester further comprises a closed nonmagnetic tube having a rectangular cross-section with top and bottom outer surfaces and smooth top and bottom inner surfaces, which encircles and rotates with said wheel, said power harvester comprising at least one cylindrical or nearly-cylindrical magnet having its magnetic axis perpendicular to the plane of said tube, said magnet and bearing enclosed within said tube such that said magnet is in contact with and supported by said bearing and is free to move within said tube, said coils affixed to the top and/or bottom outer surface of said tube with their center axes along the direction of said magnetic axis but orthogonal to the direction of magnet movement, such that said magnet and said coil move with respect to each other when said wheel is in motion such that an electrical current is produced in said coil.

42. The tire pressure system of claim 41, wherein said air pressure sensor is an absolute pressure sensor and said data storage and/or wireless transmitter circuit is a transmitter circuit, further comprising:
    a wireless receiver external to said wheel which receives said transmitted signal;
    an atmospheric pressure sensor external to said wheel; and
    circuitry external to said wheel connected to receive said wirelessly transmitted signal and the output of said atmospheric pressure sensor and to compute and display gage pressure.

43. The tire pressure system of claim 40, wherein said power harvester further comprises a closed nonmagnetic tube which encircles and rotates with said wheel, said power harvester comprising at least one cylindrical or nearly-cylindrical magnet having its magnetic axis point toward the radial direction of said tube, said magnet and bearing enclosed within said tube such that said magnet is in contact with and supported by said bearing and is free to move within said tube, said coils affixed to the inside and outside diameters of said tube, such that said magnet and said coil move with respect to each other when said wheel is in motion such that an electrical current is produced in said coil.

44. The tire pressure system of claim 43, wherein said air pressure sensor is an absolute pressure sensor and said data storage and/or wireless transmitter circuit is a wireless transmitter circuit, further comprising:
- a wireless receiver external to said wheel which receives said transmitted signal;
- an atmospheric pressure sensor external to said wheel; and
- circuitry external to said wheel connected to receive said wirelessly transmitted signal and the output of said atmospheric pressure sensor and to compute and display gage pressure.

45. The tire pressure system of claim 40, wherein said power harvester further comprises a closed nonmagnetic tube which encircles and rotates with said wheel, said coil and bearing enclosed within said circular tube such that said coil is in contact with and supported by said bearing and is free to move within said tube when said movable structure is in motion, said magnet mounted to said wheel such that said magnet and said coil move with respect to each other when said structure is in motion such that an electrical current is produced in said coil.

46. The tire pressure system of claim 45, wherein said air pressure sensor is an absolute pressure sensor and said data storage and/or wireless transmitter circuit is a wireless transmitter circuit, further comprising:
- a wireless receiver external to said-wheel which receives said transmitted signal;
- an atmospheric pressure sensor external to said wheel; and
- circuitry external to said wheel connected to receive said wirelessly transmitted signal and the output of said atmospheric pressure sensor and to compute and display gage pressure.

47. The tire pressure system of claim 40, wherein said closed tube is a non-circular tube and said magnet slides between the ends of said tube when said wheel is in motion.

* * * * *

UNITED STATES PATENT AND TRADEMARK OFFICE
CERTIFICATE OF CORRECTION

| | | |
|---|---|---|
| PATENT NO. | : 7,009,310 B2 | Page 1 of 1 |
| APPLICATION NO. | : 10/756990 | |
| DATED | : March 7, 2006 | |
| INVENTOR(S) | : Jeffrey T. Cheung and James A. Latty | |

It is certified that error appears in the above-identified patent and that said Letters Patent is hereby corrected as shown below:

In the Claims:

In column 12, line 14, change "otter" to -- outer --.

In column 16, line 12, change "said-wheel" to -- said wheel --.

Signed and Sealed this

Eighteenth Day of July, 2006

JON W. DUDAS
*Director of the United States Patent and Trademark Office*